Figure 1:
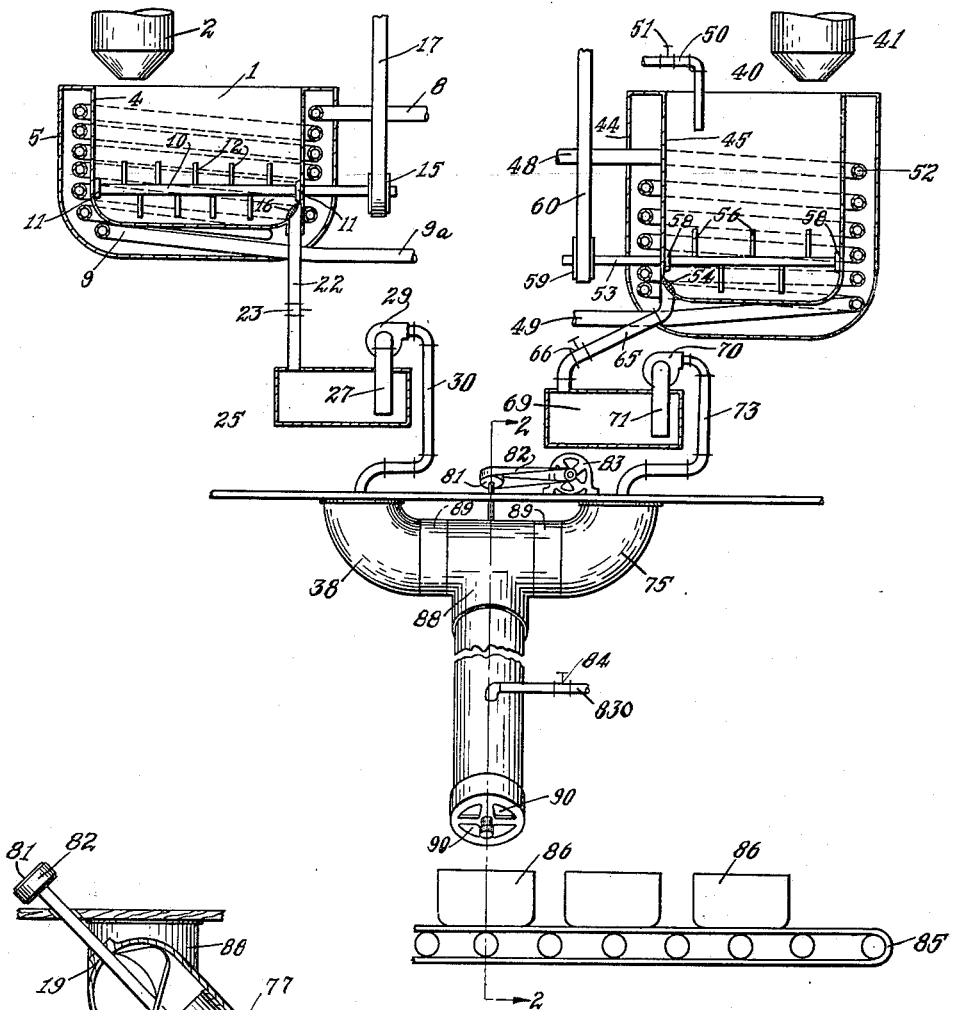

Dec. 30, 1930.  A. L. CLAPP  1,787,338
METHOD OF PRODUCING AQUEOUS DISPERSIONS
Filed Sept. 8, 1925

Inventor;
Albert L. Clapp.

Patented Dec. 30, 1930

1,787,338

UNITED STATES PATENT OFFICE

ALBERT L. CLAPP, OF DANVERS, MASSACHUSETTS, ASSIGNOR TO BENNETT, INCORPORATED, OF BOSTON, MASSACHUSETTS, A CORPORATION OF MASSACHUSETTS

METHOD OF PRODUCING AQUEOUS DISPERSIONS

Application filed September 8, 1925. Serial No. 55,063.

This invention relates to dispersions and dispersion products, and has for its primary and salient object to disperse in finely divided condition various vegetable, animal or mineral thermoplastic or fusible materials, such as the bituminous asphalts or pitches, wax, gums, rosins or resins, and the like, in an aqueous solution, and in which such finely divided or dispersed materials usually occur, substantially without chemical change. A further object of the present invention is to provide a method of, and an apparatus for, producing such dispersions in a continuous and expeditious manner.

Briefly, the general method employed in the production of the dispersion products of the present invention is to melt the thermoplastic material to be dispersed, and while at a high temperature to mix intimately therewith a hot solution of sodium silicate for a sufficient period of time to disperse the molten material without, however, allowing opportunity for a substantial chemical reaction to take place between the constituents of the mixture. Such an operation results in a dispersion with water as the dispersing vehicle or continuous phase and the thermoplastic material in finely divided state as the disperse phase. The dispersion may then be cooled and employed for the particular purpose to which it is adapted for use. If it is desired to thin down or dilute the resulting dispersion, such cooling may be accomplished by stirring cold water thereinto.

When the material which it is desired to disperse by the method of this invention has a high surface tension, it has been found desirable, in order to produce a fine dispersion, to mix therewith other material having a comparatively high penetrability and low surface tension. Only a small amount of surface-tension-reducing agent is necessary, however, it having been found unnecessary to use sufficient thereof to materially reduce the surface tension of the combined materials. For example, when it is desired to disperse paraffine, which has a high surface tension, a small quantity of wax having a low surface tension (for example, Montan wax) may be mixed therewith. As little as $\frac{1}{10}$ of 1% of such material is sufficient to effect the desired result, but much more may be added, if desired, without apparently having any further effect thereon, other than to cause the dispersion to be effected more rapidly.

As previously indicated, substantial reaction between any saponifiable material which may be present or be embodied in the material being dispersed with the sodium silicate solution is precluded or prevented, and the small reaction that may have taken place, with the resultant formation of a soap, is not relied upon as a dispersing agent. This is primarily due to the fact that an aqueous solution of sodium silicate is a relatively weak alkali, its alkali or saponifying content resulting from its hydrolysis in water, coupled with the short time of heating or saponifying action afforded between the components of the mix. When cooling of the hot mixture by the addition of cool water thereto is resorted to, the tendency toward a substantial chemical reaction between the components of the mix is further diminished and the semi-molten or hot dispersed particles are quickly congealed or frozen in their fine state of subdivision, and their tendency to cohere into large particles is in great measure prevented. Heretofore, dispersions of fusible thermoplastic materials have been produced by prolonged cooking of the material, together with some saponifiable agent to produce a soap, the soap, rather than the silicate, then constituting the dispersing agent. According to the present method, however, the soap content of the dispersion is exceedingly slight, and the dispersion possesses entirely different characteristics, which render it admirably suitable for its particular purpose.

While the general method of preparation for dispersions of all the thermoplastic materials has been found generally alike, the dispersions produced from pitchy or bituminous materials, such as asphalt, are quite distinct in respect of ultra-fineness of the dispersed particles from dispersions of such materials as wax, gums, rosins, and resins, and in order to appreciate the character of each class of products, I will discuss them separately.

The method which I employ in the preparation of a dispersion of materials in the nature of wax, gums, rosins and resins (for example, paraffine wax) is as follows: 90 parts of paraffine wax, 10 parts of rosin and 1 part of Montan wax are melted together and raised to a temperature of from 300° to 360° F. The molten mixture, having a melting point of about 120° to 130° F., is then mixed with a hot sodium silicate solution at about 200° F., and composed of about 35 to 40 parts of sodium silicate (60° Baumé) and 150 parts of water by weight, and the mixture is thoroughly stirred for about a minute or so to intimately mix the paraffine, rosin and Montan wax with the silicate solution, without, however, allowing opportunity for a substantial chemical reaction to take place. After the mixing operation, if it is desired to rapidly cool and dilute the resulting dispersion, this may be effected by a rapid addition, effected by mixing, of, say, 225 parts of cool or cold water into the mixed mass. Of course, the temperature to which the solution of sodium silicate is heated may be lower, if desired, say, 130° F., and the amount of water added to effect the cooling of the dispersion may in such case be correspondingly lowered, but in any event sufficient water to cool the mass below the melting point of the wax should be used so as to produce a stable, fine dispersion. Similarly, the amount of sodium silicate employed in effecting the solution may be lowered to, say, only 10 to 20 parts by weight, but in such case the dispersion thereby produced is not so stable, that is, a portion of the wax particles may remain in undispersed condition.

The dispersion produced comprises finely divided particles of wax suspended in the silicate solution, the dispersed particles occurring in minute solid grains or granules in substantially unchanged chemical condition and being inert, much as chalk or talc might exist in finely divided state in water. Upon standing for a while, the dispersed particles of wax rise to the surface as a fine, creamy mass, and may be removed for application in a thick paste. When such material is dried by evaporation, heat, or pressure, and then subjected to heat above the melting points of the dispersed constituents, and then cooled, these constituents coalesce and revert to their original forms. Silicate of soda does not appear to be as successful as the dispersing agent when rosin alone is employed as a surface tension reducer for the paraffine, as when a very small proportion of Montan wax is also present. In place of the Montan wax, carnauba wax may be employed in practically the same proportions as the Montan wax, with only slightly inferior results. The proportion of rosin may be largely increased, if desired, though this produces a somewhat coarser dispersion. For example, 50 parts of rosin to 50 parts of paraffine may be used. It has been found, however, impossible to produce a finely dispersed emulsion or dispersion without the Montan wax or its equivalent, but if the proportion of Montan wax is increased sufficiently (for example, equal parts of paraffine and Montan wax being used), it is possible to eliminate the rosin. If 50 parts of rosin and 5 parts of Montan wax are used for the dispersed material, and 30 parts of silicate of soda to 150 parts of water are used as the hot dispersing solution, together with the subsequent addition of 225 parts of cooling water, a very fine and uniform dispersion results.

A mixture of paraffine and carnauba waxes may also be finely dispersed in a silicate solution. For example, 70 parts of paraffine and 30 parts of carnauba wax may be melted together and heated to a temperature of from 350° to 400° F., and added with agitation to a hot silicate solution comprising 150 parts of water and 20 parts of sodium silicate (60° Baumé), and the mass cooled quickly by the addition of 120 parts of cold water.

Carnauba wax may also be finely dispersed by this method, if there be added thereto a very small amount of rosin. Thus, 100 parts of carnauba wax and 2 parts of rosin may be melted together and dispersed in 170 parts of boiling silicate solution by the method hereinbefore described. Dispersions of the nature hereinbefore described are of value in many arts for waterproofing purposes and as foundations for colored waxes and polishes. For example, carnauba wax dispersions are excellent foundations for edge stains or polishes for shoes. The dispersed material is readily mixed with other materials, powdered, granular, or fibrous, and when dried and heated, it reverts to its original condition. It does not carry combined water to be driven out when being dried, nor is it sticky or otherwise difficult to handle.

In the appended claims, I desire to have it understood that the word "thermoplastic," as a noun, is used therein in a generic sense, to include wax, gums, rosins or resins, as well as bituminous compounds.

In the case of bitumens such as asphalt and pitches, the dispersions are of a somewhat modified character, as will appear from the following detailed description of the products produced therefrom and their methods of preparation. The general method which I employ is similar to the dispersions produced from waxes, resins and the like, but, as indicated, the products have different characteristics. For example, in the preparation of a dispersion of asphalt, the process consists in melting asphalt into which has preferably been incorporated rosin or an equivaient material, preparing a hot solution of sodium silicate, and finally intimately mixing the bituminous material with the dispersing solution of silicate, without, however, allowing opportunity for a substantial chemical reaction to take place between the saponifiable materials contained in the melt and the alkaline sodium silicate. The molten asphalt, if mixed with the dispersing solution below a fixed critical temperature, yields a dispersion with water as the continuous phase and the asphalt in minute or colloidal particles as the disperse phase. The dispersion is then cooled, and is suitable for a great variety of uses, some of which will hereinafter be pointed out.

As hereinbefore stated, if it is desired to thin down or dilute the resulting dispersion, the cooling may be accomplished by stirring cold water thereinto. I have noted as a curious phenomenon that if, however, the molten asphalt is mixed with the dispersing solution above the fixed critical temperature, a dispersion results in which the asphalt constitutes the continuous phase and the dispersing solution of sodium silicate in minute or colloidal particles the disperse phase, and which I term an "invert dispersion." This invert or water-in-asphalt dispersion is characterized by its asphaltic appearance under mechanical manipulation at a temperature of 100° to 110° F., and with the addition of a slight amount of water, the invert dispersion reverses phases and the asphalt-in-water dispersion, with water as the continuous phase and asphalt as the disperse phase, results. The reversion can only take place under certain conditions, for example, the conditions stated, and I have found that if too large a quantity of water is utilized or if too high or too low a temperature is employed in the manipulation of the "invert," no reversion takes place after the water-in-asphalt dispersion has once been formed. For asphalts that melt at about 220° F., the critical temperature (that is, the temperature above which the invert dispersion is formed) is about 415° F., but the critical temperature varies with asphalts of different melting points. For example, the procedure in producing a dispersion of asphalt in water, which is not an invert, may be as follows. The solid asphalt of a melting point of, say, about 220° F., preferably mixed with about 10% of rosin or any other equivalent surface tension reducer, such as Montan wax or carnauba wax, is melted and heated to a temperature of about 320° F. to 360° F. The dispersing solution of sodium silicate is made up by mixing sodium silicate of 60° Baumé with approximately an equal weight of water, and heating the solution to a temperature of about 180° to 212° F. At these respective temperatures, the degrees Baumé of the two materials, that is, the molten asphalt and the sodium silicate solution, are approximately the same. About 1000 parts of molten asphalt mixture and about 700 parts of dispersing solution are mixed together for about a minute or two, the dispersing solution and the asphalt being intimately and thoroughly mixed, with the result that the asphalt disperses into minute or colloidal particles, which are enveloped or protected by a film of dispersing solution. Dilution and cooling, if desired, may be effected by adding and stirring cold water into the mass. If, for example, 1000 parts of water are employed in cooling the dispersion formed, a mass of creamy consistency is obtained. Because of the rapidity of the mixing or dispersing operation, substantial reaction between the sodium silicate and the rosin or other saponifiable material contained in the asphalt melt is precluded or prevented, and the small reaction that may have taken place, with the resultant formation of a soap, is not relied upon as the dispersing agent. It may be stated that the cooling of the hot mix tends to diminish the tendency of a substantial reaction and to congeal the dispersed asphalt particles while in their fine state of subdivision, and to prevent over-cohesion into larger particles.

Heretofore, so far as I am aware, as in the case of wax or rosin dispersions, dispersions of bituminous or asphaltic materials in sodium silicate have been produced only by prolonged cooking of the mixture together with some agent which saponifies with the silicate, the soap, rather than the silicate, then being relied upon as the dispersing agent. According to the present method, the soap content is exceedingly slight, the rosin content being free, rather than as rosin soap, and the dispersion is much finer than when a material saponification has been effected. The asphalt dispersion produced presents a brownish appearance, in contradistinction to the well known black bituminous dispersions produced by employing clay as the dispersing agent. Moreover, it is adhesive and cohesive, and possesses the remarkable property of adhering to damp or even wet surfaces, particularly if resin is employed in the asphalt mix. With the elimination of water from the dispersion, due to evaporation, heat or pressure, the asphalt particles coalesce, the property of adhesiveness becoming more and more marked, and the dispersion loses its brownish appearance and finally sets or solidifies, and in so doing resumes a black asphaltic appearance. I have found that the brown color of the dispersion may be traced directly to the ultra fineness of the asphalt particles therein, which is probably due in great measure to the particular method employed in its dispersion and preparation. Their fineness may be conveniently demonstrated by diluting or thinning down the dispersion until a dilute suspension or dispersion having a turbid appearance is produced. Upon standing for days or even weeks, the turbidity persists, that is, there is practically no tendency for the dispersed asphalt particles to settle. Experiments have shown that the fineness of the particles is such that about 90% of the dispersion as prepared, when properly diluted, will pass through a 300 mesh screen, and I have reason to believe that a high percentage of the particles would pass through screens of 400, 500 and possibly higher mesh. When the creamy dispersion produced is diluted to the proper consistency, it makes an excellent black paint, due to its property of adhesiveness, as well as its remarkable covering power, which no doubt arises from the fineness of the asphalt particles. Moreover, a colored paint may be made very easily, by mixing in a suitable amount of pigment with the dispersion. For example, if a red paint is desired, a certain amount of very finely divided ferric oxide ($Fe_2O_3$) may be mixed in with the dispersion. Or very finely divided or colloidal copper may be mixed with the dispersion to produce a product which may be employed to great advantage as a shingle paint. Under the action of moisture and the atmosphere, the copper particles contained in such paint undergo oxidation and carbonation, resulting in a green surface layer, which imparts a very pleasing and ornamental, as well as aged, appearance to a roof. If desired, a certain amount of oxidizing or carbonating agent, as for example ammonium carbonate [$(NH_4)_2CO_3$], may be added to such shingle paint to undergo a reaction with the finely divided copper to produce the green carbonate of copper, and to thereby impart a copper-like appearance to a roof.

The ability of the dispersion to be colored by finely divided mineral oxides, mineral salts, or any other coloring agents or pigments, is also due to the fineness of the asphalt particles in the dispersion dilution, owing to the complete covering of the asphalt particles by the coloring agent or pigment.

While the dispersion may be effected with or without the addition of rosin or Montan wax to the asphalt, I prefer its use or the use of an equivalent agent, because it imparts a better bonding or adhesive power to the emulsion and because it lowers the surface tension of the asphalt and permits exceedingly fine dispersions to be obtained. The dispersion lends itself to a great variety of uses, and may be used for waterproofing roofs, floors, etc., and may be properly compounded with other materials and serve as a waterproofing saturating agent or a filler. It may be mixed, for example, with ground cork, and serve as an excellent shoe filler. It may also be mixed with large amounts of inert filling material, such as asbestos, sand, wood flour. Such mixtures are suitable, for example, for use in tree surgery, or may be employed as a filler for wall board, or as a coating for prepared roofings.

The dispersion alone is an excellent material for cementing or binding paper board or leather, and may thus be employed for cementing soles and taps of shoes, as well as in the manufacture of box board and boxes. The dispersion may also be used instead of tarvia as a road spray, and when mixed or compounded with sand, rock, together with other fillers and binders, such as cement or sodium silicate, it may be employed as a road binder. The dispersion, itself, may be used with great advantage as a waterproof coating or impregnating material for roofs, telegraph poles, piles, wood, etc. Such a coating or impregnating material preserves the wood or other material from deterioration, by excluding the access of moisture thereinto. The dispersion may also be incorporated with fibrous material in the beater, to produce a sheet impregnated or saturated with waterproofing material. Thus, in all these applications, it may be used in preference to asphalt, because it does not require heating to render it fluid or molten. In all such uses, moreover, it also surpasses the ordinary asphalt dispersion with clay as the dispersing agent, in that when it sets, it possesses a natural asphaltic luster, and the longer it stands and the more it is subjected to the action of water, the more waterproof is becomes, due to the leaching out of the soluble dispensing agent therefrom. Thus, after such leaching out of the dispersing agent, there is very little tendency for "reemulsification" or "redispersion," which is always present in "set" clay dispersions.

While the description of the preparation of the bituminous dispersion has been confined to a more or less preferred procedure which has proven in practice to give optimum results, it is to be understood that this was by the way of example only, and that the various proportions of the components and the temperatures suggested are subject to some variation. For example, the asphalt need only be heated above its melting point and below the critical temperature hereinbefore mentioned, in order that a dispersion thereof may be effected, and the dispersion solution may be made up in various strengths, and may be heated to somewhat different temperatures. The amount of surface tension reducer added to the asphalt, which also adds to the adhesiveness of the dispersion, may also be varied, and the amount of cooling water added depends only upon the consistency of the dispersion which it is desired to obtain.

I have noted that I have secured the best results in respect to the fineness of the dispersed particles of asphalt, as well as the dispersed particles of the gums, rosins and waxes, when these materials and the dispersing solution have about the same Baumé test at the temperature to which the substances are heated before they are brought together. Of course, as the asphalt or other thermoplastic becomes more fluid under increasing temperatures, its Baumé test decreases. This, however, is not true to the same marked extent with the solution of sodium silicate, for a marked increase in the temperature of the sodium silicate solution does not result in a like decrease in degrees Baumé. Consequently, in dispersing asphalt, for example, the solution of sodium silicate and water is made with such proportions of its components that when the asphalt is heated to the desired degree of fluidity, the asphalt and the dispersing solution, when the latter is heated, have about the same Baumé test. My theory as to the reason why the materials, especially the asphalt, are divided into colloidal particles of ultra-fineness by the simple mixing operation is, that when the asphalt and the dispersing solution under the conditions stated respond approximately to the same Baumé test, they are in such condition that they intimately mix or are mixable, so as to form a physically homogeneous mixture, so that the material is in a condition to be acted upon by the dispersing material very completely, and each component is consequently in the final state of ultra subdivision. While for some purposes the water-in-asphalt or invert dispersion may be deliberately produced by operating at or beyond the critical temperature for the particular asphalt employed, yet ordinarily a procedure should be followed in which the asphalt is primarily dispersed as the disperse phase in the continuous aqueous medium or vehicle, by heating the asphalt to a point below the critical temperature.

On the accompanying drawings, I have represented somewhat diagrammatically and conventionally an apparatus by which the process may be carried out in a continuous manner for the preparation of dispersions of the character hereinbefore indicated, in which Figure 1 represents a front view of the apparatus partly in section.

Figure 2:
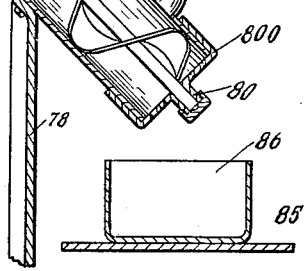

Figure 2 illustrates a sectional view of the mixer along the line 2—2 of Figure 1.

Referring to the drawings, 1 represents a kettle in which the thermoplastic material may be melted, this material being fed from a hopper 2 thereabove. The kettle is double-walled, comprising respectively the inner and outer walls 4 and 5, enclosing a heating jacket or space in which any suitable means for heating the material may be provided. As shown, the heating means consist of a steam heating coil 9 within this jacket, to which steam at suitable temperature and pressure is supplied through an inlet conduit 8, and from which condensate is removed through an outlet conduit 9a. To ensure uniform heating of the material, provision is made to secure a positive circulation thereof in the melter. For this purpose the melter is provided with a stirrer, comprising a stirrer shaft 10 carrying a plurality of paddles or stirring blades 12, and suitably supported by a pair of fixed bearings 11, 11, secured to the wall 5 of the kettle. Rotation is imparted to the stirrer shaft as by a belt pulley 15, fixed to its outer end and driven by a belt 17 from a motor or counter shaft (not shown). The molten material, heated to the desired temperature, passes from the melter through a screened outlet 16 at its lower end, through a pipe 22 valved as at 23, into a storage tank 25, from which it is supplied to the mixer in constant and predetermined amount. The means for supplying the material to the mixer comprises a pump 29, communicating with the storage tank 25 through an intake conduit 27, and which delivers the molten material through a discharge conduit 30 to a worm or conveyor type mixer, where it meets the hot dispersing solution.

The dispersing solution, which is a solution of sodium silicate, is made up and heated to the desired temperature in a tank 40. The silicate is fed thereinto from a hopper 41 directly thereabove, and is mixed with a suitable proportion of water delivered from a water supply line 50, valved as at 51. The tank is similar in construction to the melter 1, consisting of the two spaced walls 44 and 45, between which is disposed a steam coil 52, having steam inlet 48 and condensate outlet 49. To secure a uniform solution and heating thereof, the tank is provided with a stirrer, consisting of the stirrer shaft 53 having a plurality of paddles 56 and journaled in suitable bearings 58, 58, on the inner wall 45 of the tank. Rotation is imparted to the stirrer shaft by a belt pulley 59 fixed to the outer end of the shaft 53 and driven by a belt 60 from a countershaft or motor (not shown). The prepared dispersing solution flows from the lower end of the tank through a screened outlet 54 and a conduit 65, valved at 66, into a supply tank 69, from which it is supplied in predetermined quantity to the mixer. The supply means comprises a pump 70 communicating with the supply tank 69, through an intake conduit 71, and which discharges the dispersing solution through a discharge conduit 73 into the mixer.

The mixer, as previously indicated, is of the continuous or spiral type, and comprises a worm or spiral 76, arranged axially in a cylindrical casing 77, disposed at an angle of about 45 degrees to the horizontal, and suitably supported by frame member 78. The mixer is connected at its upper end to a T fitting 88, which is connected by the nipples 89, 89 on opposite sides to the elbows 38 and 75, serving respectively as spaced inlets for the asphalt and the dispersing solution. The screw 76 has a central shaft suitably journaled in a bearing 19 carried by the T 88, and in a step bearing 80, in a cap 800 at the lower end of the casing, and has a belt pulley 81 fixed thereto at its upper end between the spaced inlets and to which rotation is imparted as by a belt 82 from a motor 83. The molten material and the dispersing solution meet at the upper end of the mixer, and are intimately agitated and mixed, forming a dispersion with the bituminous material, which is conveyed to the lower or discharge end of the mixer. The dispersion may be cooled and diluted simultaneously, prior to its discharge, by introducing water into the casing 77, through a conduit 830 valved as at 84. The finished dispersion is finally discharged through apertures 90 through the cap 800, into suitable containers, as for example, the tanks 84, carried on a conveyor 85. If desired, the casing may be provided at its lower end with a hopper 91, in which various materials to be incorporated or mixed with the dispersion may be introduced after it has been formed.

The apparatus may be used for the preparation of other substances than dispersions where a mixture of two materials is to be effected during a brief period of time. For example, it may be used with advantage in the continuous manufacture of rosin size. The rosin is melted in a similar manner to the asphalt, and the saponifying solution of sodium silicate, sodium carbonate, or sodium hydroxide, or equivalent alkali, is made up in the tank 40 in a similar manner to the dispersing solution as before described. The rosin and the saponifying solution are then brought together and intimately mixed for a brief period in the continuous mixer, in predetermined proportions, and the finished size may be cooled and diluted, if desired, and discharged from the lower end of the mixer. The precise time of mixing and reaction in the continuous mixer may be suitably regulated by regulating the speed of the worm or by having it longer or shorter in length. One great advantage in the manufacture of size by such a process lies in the greater amount of free rosin that can be obtained in the finished product than when size is made by a batch process, where the rosin and the saponifying agent are brought together, heated, and cooked in batches.

Having thus described certain embodiments of this invention, it should be obvious to those skilled in the art that it is susceptible of various changes and modifications without departing from its spirit or scope as defined by the appended claims. I do not herein specifically claim bituminous dispersions and their method of preparation, as these have been fully set forth in my application, Serial No. 39,049, filed June 23, 1925, but what I claim is:

1. A method of producing aqueous dispersions of thermoplastic material, which comprises feeding an aqueous dispersing liquor and a molten thermoplastic material in continuous streams and at predetermined rates through an elongated mixing chamber, intimately mixing together the streams to effect a dispersion of the molten thermoplastic material in the aqueous liquor, and chilling the dispersion to congeal the particles of dispersed thermoplastic material immediately before the dispersion emerges from the mixing chamber.

2. A method of producing aqueous dispersions of thermoplastic material, which comprises preparing a hot batch of liquefied thermoplastic material and a hot batch of aqueous dispersing liquor, progressively withdrawing the thermoplastic material and the liquor as continuously moving streams from the batches, uniting the streams, and intimately mixing them to effect a dispersion of thermoplastic material in the aqueous liquor.

3. A method of producing aqueous dispersions of thermoplastic material, which comprises preparing a hot batch of liquefied thermoplastic material and a hot batch of aqueous sodium silicate solution, progressively withdrawing the thermoplastic material and the solution as continuously moving streams of comparatively small cross-sectional area from the batches, uniting the streams into a single, continuously moving stream, and thoroughly agitating the continuously moving stream to effect a dispersion of the thermoplastic material in the aqueous sodium silicate solution.

In testimony whereof I have affixed my signature.

ALBERT L. CLAPP.